May 17, 1966     A. R. HILTON     3,251,718
SCREEN TYPE FUEL CELL WITH FORAMINOUS ELECTROLYTE CARRIER
Filed Oct. 26, 1961
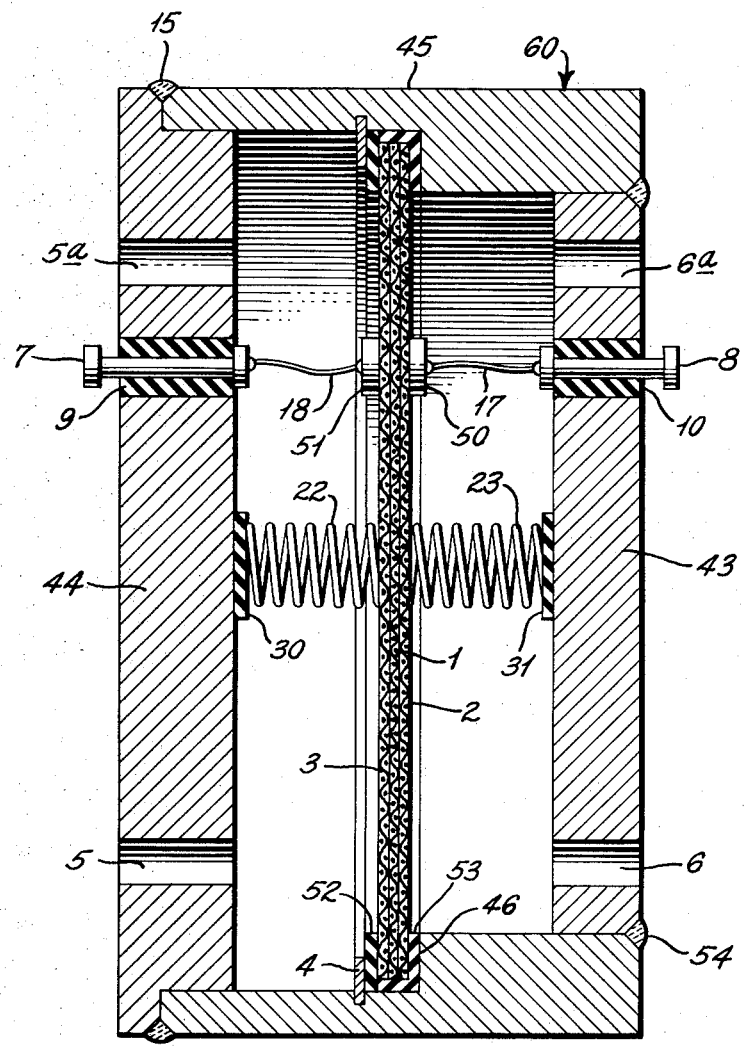
INVENTOR
*Albert R. Hilton*
BY *Robert C. Peterson*
ATTORNEY

United States Patent Office 3,251,718
Patented May 17, 1966

3,251,718
SCREEN TYPE FUEL CELL WITH FORAMINOUS ELECTROLYTE CARRIER
Albert R. Hilton, Richardson, Tex., assignor to Texas Instruments Incorporated, Dallas, Tex., a corporation of Delaware
Filed Oct. 26, 1961, Ser. No. 147,880
7 Claims. (Cl. 136—86)

In general, fuel cells require a fuel electrode and an oxidant electrode separated by an electrolyte. Typically, a reservoir type hydrocarbon fuel cell requires a fuel such as methane contacting an electrode and the electrolyte in one portion of the cell concurrent with an oxidant such as air contacting a second electrode and the electrolyte in an adjacent portion of the cell. The electrolyte must separate the fuel and fuel electrode from the oxidant and oxidant electrode, yet chemically interconnect the electrodes. Such an arrangement will produce an electromotive force that will cause a current to flow between the electrodes through an external circuit.

The present invention provides a current generating device having an extremely high density of individual fuel cells per unit volume, such a density being achieved by using thin screens which may be perforated membranes or other types of screens for the fuel electrode, the oxidant electrode and the electrolyte carrier. Several advantages accrue from the fuel cell of the invention which have heretofore not been achieved. For example, the thin screen or perforated membrane containing the electrolyte reduces the internal resistance of the cell. The individual fuel cell thinness permits a higher density of fuel cells per unit volume than heretofore. The strong mechanical construction affords high reliability for maintaining separation of the fuel side of the cell from the oxidant side of the cell. Also, the screens may be positioned in high tension, thus increasing distortion resistance.

It is therefore an object of the invention to provide a triple screen fuel cell in which the molten electrolyte is held by surface tension in the center screen of the triscreen assembly, one outer screen acting as the fuel electrode and the other outer screen acting as the oxidant electrode;

It is another object of the invention to provide a fuel cell having a perforated membrane electrolyte carrier in which the electrolyte is maintained within the perforations of the membrane by surface tension;

It is still another object of the invention to provide a fuel cell having a thin screen electrolyte carrier, the screen insulatively separating the fuel and oxidant electrodes;

It is a further object of the invention to provide a fuel cell having an insulated metal screen electrolyte carrier intimately contacted on opposing sides by conductive screen electrodes;

Still another object of the invention is to provide a high temperature fuel cell which is temperature resistant, mechanically strong, and of high electrical output per unit of electrode surface area.

Other objects and advantages of the invention will become apparent from the following description, taken in conjunction with the appended claims and accompanying drawing in which the sole figure represents a vertical sectional view illustrating the construction of the fuel cell of the invention.

Referring, now, to the single figure of the drawing, a housing 60 is provided having a closed end 43 with inlet and outlet ports 6 and 6a therein, respectively, and an electrical terminal 8 extending therethrough and firmly supported within insulation piece 10. To the inner end of terminal 8 is connected flexible conductor 17 for a purpose to be described hereinafter. The housing 60, when all the apparatus is fitted therein as will be later described, is closed at its open end by member 44 which, like member 43, is similarly provided with inlet and outlet ports 5 and 5a, respectively, and electrical terminal 7 extending therethrough and supported within insulation piece 9.

The housing 60, which may be of any suitable material, though metal is preferred, need have no particular shape or size. Thus it may be in the form of a square box, a rectangle, a cylinder or any other suitable configuration. For the purpose of this description, however, it will be assumed that the housing is cylindrical in form. The end member 43 is therefore circular in form, to which is welded or otherwise suitably secured the member 45 having an internal circular shoulder 46. The closing member 44, is, of course, also circular, internally configurated as shown in the drawing, to fit the open end of member 45.

An insulative insert 53 lines the shoulder 46 and part of the internal periphery of member 45.

With the left end of the housing open and the interior thereof exposed, a circularly shaped fuel screen electrode 2 is positioned against insulative insert 53 which lines shoulder 46 and a portion of member 45. Electrode 2 may be made of any suitable metallic gauze of high conductivity, for example hundred-mesh silver. The right face of electrode 2 is suitably cemented to insert 53 to electrically insulate the electrode from member 45, and is further provided with a conducting terminal 50 soldered or otherwise conductively joined in any suitable manner to the mesh on the right face of the screen and in a location preferably in alignment with the terminal 8. It should be stated that before the fuel screen 2 is placed in position in the interior of the housing as above described, the flexible conductor 17 is joined to terminal 50, said conductor having already been joined to the inner end of terminal 8.

Placed against the fuel electrode 2 is the circular-shaped screen electrolyte carrier 1. This screen may be of mesh steel, for example, which is flame-sprayed with aluminum oxide to make it nonconductive. It is then immersed in a suitable molten electrolyte such as sodium lithium carbonate and held therein until the interstices of the screen are filled. Because of the closeness of the mesh, the molten electrolyte is held in said interstices by surface tension. Against the exposed face of the screen electrolyte carrier 1 and in contact therewith is placed the oxidant screen electrode 3 which is substantially identical in shape and construction to the fuel screen electrode 2. A washer 52 of insulating material is placed to abut the left side of electrode 3 and part of liner 53. After the oxidant screen 3 is placed in position, or prior thereto, flexible conductor 18 is connected to terminal 51 and the inner end of terminal 7. Optionally, but as illustrated, springs 22 and 23, being insulated from housing 60 by insulation 30 and 31, are provided to maintain intimate contact of screens 2 and 3 with screen 1.

Due to the symmetry of the apparatus, as indicated by the drawing, it is evident that the fuel screen 2 and the oxidant screen 3 may be interchanged, each acting either as the fuel electrode or the oxidant electrode. The "sandwich" of the two electrodes 2 and 3 with the electrolyte electrode 1 in the middle thereof, is then locked in place by the tight-fitting retainer ring 4 firmly abutting against the insulating washer 52 of the oxidant electrode 3. The housing 60 is then closed with the plate 44, which is sealed to the end of the housing by the weld 15 or by any other suitable means.

If desired, the screens 1, 2 and 3 may be tautly stretched and mounted in a frame. Such construction would afford good mechanical strength to a very thin screen, thereby avoiding problems encountered if porous ceramic disks were utilized.

To achieve chemical operation of the fuel cell, screen 1 serves as the molten electrolyte carrier. The molten electrolyte is held within the interstices of electrolyte carrier or screen 1 by surface tension. Screens 2 and 3 are used as the fuel electrode and oxidant electrode, respectively. However, and as before stated, either electrode could serve as the fuel or oxidant electrode.

In operation, fuel, for example natural gas, is admitted through inlet port 6 and flows into the interstices of screen 2 and contacts the electrolyte maintained by surface tension within the interstices of the electrolyte carrier or screen 1. The fuel contacts the electrolyte and the fuel electrode 2 causing a chemical reaction to occur. Waste fuel is allowed to escape through outlet port 6a. Concurrent with the reaction at the fuel electrode 2, another reaction is taking place at the oxidant electrode 3. The oxidant, for example air and $CO_2$, is admitted through inlet 5 and flows into the oxidant electrode or screen 3 and contacts the electrolyte contained within screen 1. The waste oxidant is allowed to escape through outlet port 5a. It should be appreciated that inasmuch as the screen 1 has a high mechanical strength compared to a ceramic disk, it may be very thin, for example 20 mils or even less. Typically, the electrolyte carrier 1 and electrodes 2 and 3 could be metal screens or gauzes. It is preferable that screen 1 have a high resistivity. If screen or electrolyte carrier 1 is metallic, it is, of course, necessary that it be insulated, which can be readily accomplished by flame spraying a very thin ceramic film thereon.

It should also be appeciated that screen 1, serving as the electrolyte carrier, is readily available and requires very little preparation prior to being utilized as the electrolyte carrier. Moreover, thin screens which are readily available can be rapidly prepared to serve as the electrolyte carrier by flame spraying ceramic films thereon, after which they are soaked in the molten electrolyte. In view of their ready availability, the screens may be readily assembled into a fuel cell as hereinabove stated.

The following are two examples of fuel cells made in accordance with the present invention:

With reference to the sole figure, one construction was as follows: screen 1 was a 40 mesh steel screen flame-sprayed with aluminum oxide to make it nonconductive. The screen was immersed in a molten sodium lithium carbonate electrolyte which filled the interstices in the screen, remaining therein by surface tension. Fuel electrode 2 and oxidant electrode 3 were made of hundred mesh silver screens. Lead wires 17 and 18 of silver were fuse-welded to the silver screens or conducting perforated membranes 2 and 3, respectively. Springs 22 and 23 were Inconel X metal, and insulators 30 and 31 were mica. This cell was designed to operate at a high temperature and was operated at 600° C., utilizing hydrogen as the fuel and carbon dioxide and air as the oxidant. An open circuit voltage of 0.85 volt was attained, the cell producing about 12 milliwatts of power.

In another fuel cell similar in construction to the above, the fuel electrode 2 was silver with nickel oxide thereover and the lead wire 18 from the fuel electrode was platinum. Lithium carbonate and sodium carbonate were used as the electrolyte. Instead of Inconel X springs, silverplated steel wool was used as the backup material to hold the fuel electrode 2 and the oxidant electrode 3 against the screen electrolyte carrier 1. Mica insulation was provided within the entire body of the cell to avoid electrical shorting through the steel wool material. The oxidant electrode 3 was again a silver screen; however, the lead wire 17 was platinum. Hydrogen again was used as the fuel while air and $CO_2$ was used for oxidant. The cell was operated at 625° C. and exhibited an internal resistivity of less than 0.2 ohm (no lower reading could be achieved on the meter utilized). However, it is believed that the actual resistivity was less than 0.1 ohm. The open circuit voltage was approximately 1 volt almost as soon as the hydrogen fuel gas and the air-carbon dioxide oxidant gas were fed into the cell. The hydrogen flow rate was 30 cc. per minute and the air flow was 100 cc. per minute while the $CO_2$ flow was 60 cc. per minute. The initial power output was 0.250 watt.

Although the preferred embodiment of the present invention utilizes a steel screen with a flame-sprayed aluminum oxide coating thereon, many other suitable screens, for example anodized aluminum, will afford the mechanical strength and retain the electrolyte therein by surface tension. Moreover, instead of utilizing a unitary fuel cell element as in the present invention, it is relatively easy to assemble a close packed stack of fuel cell elements to increase the power output and yet retain a small compact fuel element power package.

It should be understood that although the present invention has been described with reference to a preferred embodiment of a fuel cell, many other modifications and variations thereof will become apparent to those skilled in the art and may be resorted to without departing from the spirit and scope of the invention as defined by the appended claims.

What is claimed is:
1. A fuel cell comprising
 (a) a foraminous metallic electrolyte carrier having an electrically nonconductive coating on the surfaces thereof,
 (b) a screen fuel electrode,
 (c) a screen oxidant electrode, said fuel electrode and said oxidant electrode intimately contacting said nonconductive coating on opposing surfaces of said electrolyte carrier,
 (d) an inorganic electrolyte, substantially all of which is retained within the foramina of said electrolyte carrier, said inorganic electrolyte being solid at about room temperature and essentially liquid at the temperature of operation of said fuel cell and forming a barrier to gas flow through the foramina.
2. The fuel cell of claim 1 wherein said inorganic electrolyte comprises a combination of sodium carbonate and lithium carbonate.
3. The fuel cell of claim 1 wherein said foraminous metallic electrloyte carrier comprises a steel screen.
4. The fuel cell of claim 1 wherein said electrically nonconductive coating is aluminum oxide.
5. In a high temperature fuel cell comprising porous fuel and oxidant electrodes and an inorganic electrolyte which is solid at about room temperature and essentially liquid at the temperature of operation of said fuel cell between and in contact with said electrodes, the improvement comprising a foraminous metallic electrolyte carrier having an electrically nonconductive coating on the surfaces thereof and containing substantially all of said electrolyte within the foramina of said carrier.
6. The improvement of claim 5 wherein said foraminous metallic electrolyte carrier comprises a steel screen.
7. The improvement of claim 5 wherein said nonconductive coating comprises aluminum oxide.

References Cited by the Examiner

UNITED STATES PATENTS

| | | | |
|---|---|---|---|
| 1,090,372 | 3/1914 | Achenbach | 136—157 |
| 2,612,538 | 9/1952 | Cahoon et al. | 136—86.3 |
| 2,880,260 | 3/1959 | Strauss | 136—143 |
| 2,914,596 | 11/1959 | Gorin et al. | 136—86 |
| 2,980,749 | 4/1961 | Broers | 136—86 |
| 3,134,697 | 5/1964 | Niedrach | 136—86 |
| 3,146,131 | 8/1964 | Linden et al. | 136—86 |

FOREIGN PATENTS 806,592  12/1958  Great Britain.

WINSTON A. DOUGLAS, *Primary Examiner.*
JOHN R. SPECK, *Examiner.*
H. FEELEY, A. B. CURTIS, *Assistant Examiners.*